US011348698B2

(12) United States Patent
Kim et al.

(10) Patent No.: US 11,348,698 B2
(45) Date of Patent: May 31, 2022

(54) NUCLEAR FUEL PELLET LAMINATE STRUCTURE HAVING ENHANCED THERMAL CONDUCTIVITY AND METHOD FOR MANUFACTURING THE SAME

(71) Applicant: KOREA ATOMIC ENERGY RESEARCH INSTITUTE, Daejeon (KR)

(72) Inventors: Dong-Joo Kim, Daejeon (KR); Dong Seok Kim, Daejeon (KR); Heung Soo Lee, Daejeon (KR); Jihae Yoon, Daejeon (KR); Jae-Ho Yang, Sejong (KR); Hyun Gil Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/154,103

(22) Filed: Jan. 21, 2021

(65) Prior Publication Data
US 2021/0358645 A1 Nov. 18, 2021

(30) Foreign Application Priority Data

May 13, 2020 (KR) .................. 10-2020-0057352

(51) Int. Cl.
*G21C 3/04* (2006.01)
*G21C 3/07* (2006.01)
*G21C 21/02* (2006.01)
*G21C 3/20* (2006.01)
*G21C 3/60* (2006.01)

(52) U.S. Cl.
CPC ............. *G21C 3/045* (2019.01); *G21C 3/047* (2019.01); *G21C 3/048* (2019.01); *G21C 3/07* (2013.01); *G21C 3/20* (2013.01); *G21C 3/60* (2013.01); *G21C 21/02* (2013.01)

(58) Field of Classification Search
CPC .......... G21C 3/07; G21C 3/045; G21C 3/047; G21C 3/048; G21C 21/02; G21C 3/20; G21C 3/60; Y02E 30/30
USPC ........................................ 376/420, 426, 431
See application file for complete search history.

(56) References Cited

U.S. PATENT DOCUMENTS

| 3,085,059 | A | * | 4/1963 | Burnham, Jr. | ........... G21C 3/20 376/416 |
| 6,088,419 | A | * | 7/2000 | Van Swam | .............. C22C 16/00 376/416 |
| 9,666,310 | B1 | * | 5/2017 | Mariani | .................... G21C 3/07 |

(Continued)

FOREIGN PATENT DOCUMENTS

| JP | 02293693 A | * | 12/1990 | ............. Y02E 30/30 |
| JP | 2556876 B2 | * | 11/1996 | ............. Y02E 30/30 |

(Continued)

OTHER PUBLICATIONS

Song, Kun Woo et al., "Improvement in thermal conductivity of uranium dioxide fuel", KAERI/RR-2532/2004. (May 31, 2005).
KIPO, Office Action of KR 10-2020-0057352 dated Nov. 11, 2021.

*Primary Examiner* — Darlene M Ritchie
(74) *Attorney, Agent, or Firm* — Lex IP Meister, PLLC

(57) ABSTRACT

The present invention relates to a nuclear fuel pellet laminate structure having enhanced thermal conductivity, including a nuclear fuel pellet; and a thermally conductive metal layer disposed above or below the nuclear fuel pellet, and a method for manufacturing the same.

6 Claims, 3 Drawing Sheets

(56) References Cited

U.S. PATENT DOCUMENTS

| | | | |
|---|---|---|---|
| 2004/0103752 A1* | 6/2004 | Song | G21C 3/623 |
| | | | 75/232 |
| 2007/0036261 A1* | 2/2007 | Kim | G21C 3/02 |
| | | | 376/409 |
| 2012/0183116 A1* | 7/2012 | Hollenbach | G21C 3/623 |
| | | | 376/409 |
| 2013/0083878 A1* | 4/2013 | Massie | G21C 3/54 |
| | | | 376/458 |
| 2021/0057115 A1* | 2/2021 | Subhash | G21C 21/02 |
| 2021/0125735 A1* | 4/2021 | Mariani | G21C 3/07 |

FOREIGN PATENT DOCUMENTS

| | | | | |
|---|---|---|---|---|
| KR | 102084466 | | 3/2020 | |
| RU | 2419897 C1 * | 5/2011 | | Y02E 30/30 |

\* cited by examiner

[FIG. 1]
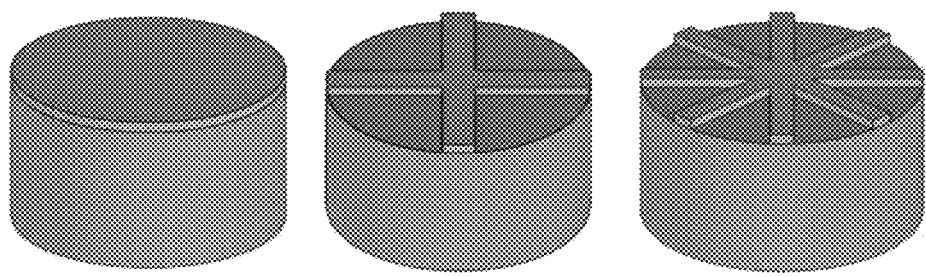
[FIG. 2a]
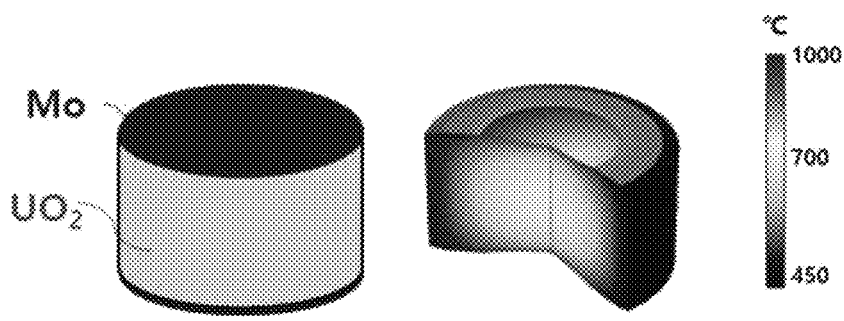
[FIG. 2b]
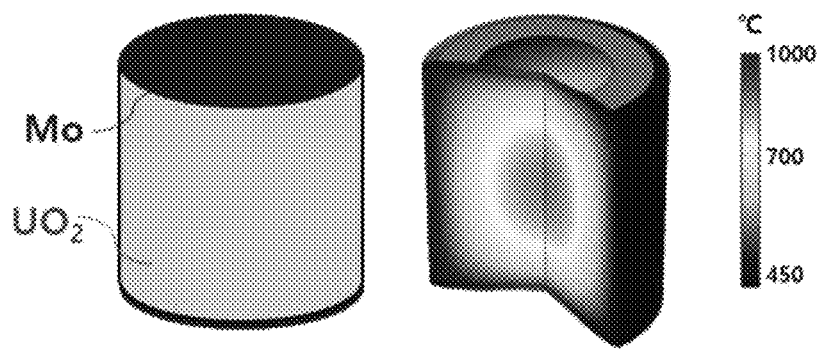

[FIG. 2c]
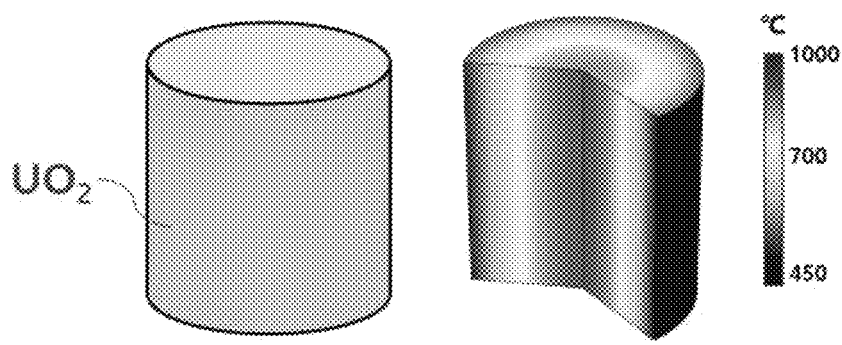
[FIG. 2d]
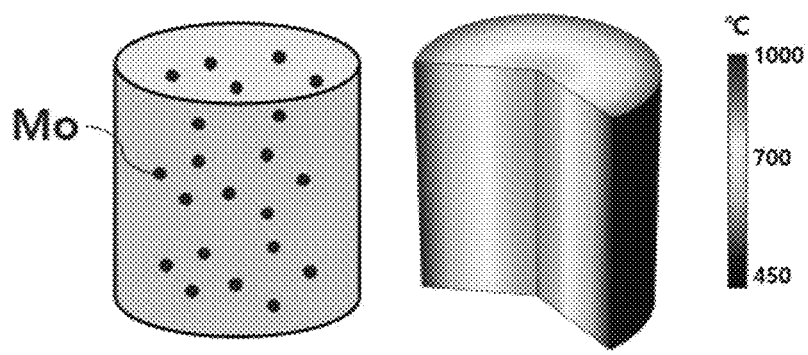

[FIG. 3]
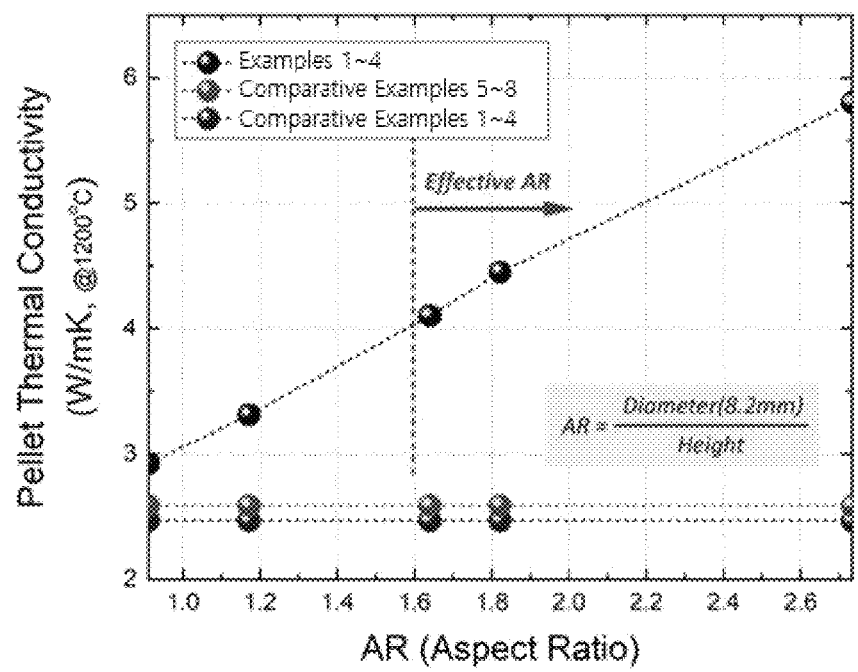

NUCLEAR FUEL PELLET LAMINATE STRUCTURE HAVING ENHANCED THERMAL CONDUCTIVITY AND METHOD FOR MANUFACTURING THE SAME

CROSS-REFERENCE TO RELATED APPLICATION

This application claims priority to and the benefit of Korean Patent Application No. 10-2020-0057352, filed on May 13, 2020, the disclosure of which is incorporated herein by reference in its entirety.

TECHNICAL FIELD

The present invention relates to a nuclear fuel pellet laminate structure having enhanced thermal conductivity, and a method for manufacturing the same.

BACKGROUND ART

Uranium dioxide ($UO_2$), which is a nuclear fuel pellet material of a light water reactor, has good compatibility with water used as a coolant for a light water reactor, has a high melting point of about 2,850° C., and exhibits excellent furnace stability such as no phase transformation even at high temperatures and the like. Therefore, although it has disadvantages in terms of thermal conductivity, uranium density, and the like compared to other uranium compounds (e.g., UC, UN, etc.), it is widely used as a nuclear fuel pellet material of a light water reactor.

However, the characteristics of low thermal conductivity of $UO_2$ form a rapid temperature gradient (about 500° C. to 700° C. in normal operations) inside $UO_2$ nuclear fuel pellets (radius of about 4.1 mm), which causes thermal and mechanical problems such as a high core temperature of nuclear fuel, a steep thermal stress gradient, and the like. These characteristics act as adverse factors in normal operations, and excessive and accident conditions. Therefore, the technology to enhance the thermal conductivity of $UO_2$ nuclear fuel pellets has been emphasized as the most important factor in terms of nuclear fuel performance and safety.

RELATED ART DOCUMENTS

Patent Documents

Korean Registered Patent Publication No. 10-2084466 (Feb. 27, 2020)

DISCLOSURE

Technical Problem

The present invention is for maximizing the effect of thermal conductivity enhancement by suppressing the formation of impurity without restriction on the selection of thermally conductive metal materials, and the present invention is directed to providing a nuclear fuel pellet laminate structure having enhanced thermal conductivity, including a nuclear fuel pellet; and a thermally conductive metal layer disposed above or below the nuclear fuel pellet, and the like However, the technical problems to be achieved by the present invention are not limited to the above-mentioned problem, and other problems that are not mentioned will be clearly understood by those skilled in the art from the following description.

Technical Solution

The present invention provides a nuclear fuel pellet laminate structure having enhanced thermal conductivity, including a nuclear fuel pellet; and a thermally conductive metal layer disposed above or below the nuclear fuel pellet.

In another embodiment of the present invention, provided herein is a method for manufacturing a nuclear fuel pellet laminate structure having enhanced thermal conductivity, including (a) a step of molding and thermally treating nuclear fuel powder to manufacture a nuclear fuel pellet; and (b) a step of disposing a thermally conductive metal layer above or below the nuclear fuel pellet manufactured in step (a).

Advantageous Effects

The present invention relates to a nuclear fuel pellet laminate structure having enhanced thermal conductivity, including a nuclear fuel pellet; and a thermally conductive metal layer disposed above or below the nuclear fuel pellet, and the present invention is characterized in that the thermally conductive metal layer is disposed separately in a post-processing process so as not to cause a chemical reaction under thermal treatment conditions. Thus, it is possible to enhance thermal conductivity by suppressing the formation of impurity.

In particular, by optimizing the ratio of the diameter to the height of the nuclear fuel pellet, the effect of thermal conductivity enhancement can be maximized by spacing apart the thermally conductive metal layer at a regular interval.

Therefore, the nuclear fuel pellet laminate structure according to the present invention can be easily applied to existing commercial nuclear fuel manufacturing facilities, and it can greatly improve nuclear fuel safety and performance in normal operations, and excessive and accident conditions.

DESCRIPTION OF DRAWINGS

FIG. 1 schematically shows the shape (plate shape, cross shape, and radial shape) of a thermally conductive metal layer according to various embodiments of the present invention.

FIG. 2(a) schematically shows a nuclear fuel pellet laminate structure and the temperature distribution thereof according to Examples 1 to 2. FIG. 2(b) schematically shows a nuclear fuel pellet laminate structure and the temperature distribution thereof according to Examples 3 to 4. FIG. 2(c) schematically shows a nuclear fuel pellet laminate structure and the temperature distribution thereof according to Comparative Examples 1 to 4. FIG. 2(d) schematically shows a nuclear fuel pellet laminate structure and the temperature distribution thereof according to Comparative Examples 5 to 8.

FIG. 3 is a calculation and evaluation of thermal conductivity according to the temperature of nuclear fuel pellet laminate structures manufactured in Examples 1 to 4 by FEM (Finite Element Method) computing simulation, and it is a graph comparing whether the thermal conductivity is enhanced under a temperature condition of 1,200° C., as a result of actually measuring the thermal conductivities of nuclear fuel pellets manufactured in Comparative Examples 1 to 8.

MODES OF THE INVENTION

Conventionally, to enhance thermal conductivity of a nuclear fuel pellet, thermally conductive metal powder was used and mixed as an additive to nuclear fuel powder, followed by molding and thermally treating to manufacture a nuclear fuel pellet, and in this case, there were some limitations.

First, in the selection of thermally conductive metal powder, considering various requirements such as high thermal conductivity, a melting point, a volatility point, a neutron absorption cross-sectional area, a coefficient of thermal expansion, $UO_2$ and Zr chemical reactivities, cooling water reactivity, and the like, the effect on the function as nuclear fuel should be minimized.

Second, as the thermally conductive metal powder is added, the ratio of the nuclear fuel powder decreases. In order to minimize this, the thermally conductive metal powder must be efficiently disposed to minimize the addition amount.

Third, there should be no problem in maintaining the chemical properties of thermally conductive metal powder under thermal treatment conditions (hydrogen atmosphere and 1,300° C. to 1,800° C.) during the manufacturing process of a nuclear fuel pellet, and it must be controlled such that it does not combine with hydrogen to form a hydride under high temperature thermal treatment conditions, or does not react with nuclear fuel powder to form a second phase.

As such, the present inventors manufactured a nuclear fuel pellet laminate structure, including a nuclear fuel pellet; and a thermally conductive metal layer disposed above or below the nuclear fuel pellet, and accordingly, the present invention was completed by confirming that the effect of thermal conductivity enhancement be maximized by suppressing the formation of impurity, without restriction on the selection of thermally conductive metal materials.

Hereinafter, the present invention will be described in detail.

Nuclear Fuel Pellet Laminate Structure Having Enhanced Thermal Conductivity

The present invention provides a nuclear fuel pellet laminate structure having enhanced thermal conductivity, including a nuclear fuel pellet; and a thermally conductive metal layer disposed above or below the nuclear fuel pellet.

The nuclear fuel pellet laminate structure having enhanced thermal conductivity according to the present invention includes a nuclear fuel pellet; and a thermally conductive metal layer disposed above or below the nuclear fuel pellet. The nuclear fuel pellet laminate structure has an advantage of being able to enhance thermal conductivity in a radial direction (horizontal direction) while suppressing the formation of impurity.

The nuclear fuel pellet is a nuclear fuel matrix, and may be in a state in which thermally conductive metal powder is not added. Specifically, the nuclear fuel pellet may include one or more oxide nuclear fuel powders selected from the group consisting of uranium oxide ($UO_2$), plutonium oxide ($PuO_2$), and thorium oxide ($ThO_2$), and other than the above, it may include one or more uranium or alloy compounds thereof selected from the group consisting of a uranium compound (U compound), a uranium-silicon compound (U—Si compound), a uranium-gadolinium compound (U—Gd compound), a uranium-thorium compound (U—Th compound), and a uranium-plutonium compound (U—Pu compound). in this case, the nuclear fuel pellet may be formed by molding and thermally treating nuclear fuel powder, and the nuclear fuel powder and the process thereof will be described below.

In this case, the height of the nuclear fuel pellet may be 3 mm to 10 mm, preferably, 3 mm to 6 mm, but is not limited thereto. Accordingly, the effect of thermal conductivity enhancement may be maximized by spacing apart the thermally conductive metal layer at a regular interval. When the height of the nuclear fuel pellet is too low, not only there is a difficulty in manufacturing, but also it is difficult to insert into a nuclear fuel cladding tube. On the other hand, when the height of the nuclear fuel pellet is too high, there is a problem in that the temperature reduction effect is lowered, and accordingly, the significant effect of thermal conductivity enhancement is reduced.

In other words, it can be seen that the ratio of the diameter to the height of the nuclear fuel pellet is 1.6 or more, preferably, 1.6 to 2.0. When the ratio of the diameter to the height of the nuclear fuel pellet is too large, not only there is a difficulty in manufacturing, but also it is difficult to insert into a nuclear fuel cladding tube. On the other hand, when the ratio of the diameter to the height of the nuclear fuel pellet is too small, there is a problem in that the temperature reduction effect is lowered, and accordingly, the significant effect of thermal conductivity enhancement is reduced.

The thermally conductive metal layer is disposed above or below the nuclear fuel pellet, and may promote heat transfer from the center to a peripheral portion in contact with a nuclear fuel cladding tube in a radial direction (horizontal direction).

Meanwhile, the thermally conductive metal layer should only be physically attached and bonded to the nuclear fuel pellet, and should not react chemically. In other words, it is preferable that impurity is not formed due to a chemical reaction of the thermally conductive metal layer, and the impurity may interfere with heat transfer. Specifically, the impurity may be a hydride formed by bonding of the thermally conductive metal with hydrogen under a high-temperature thermal treatment condition, or a secondary phase formed by reacting with nuclear fuel powder. More specifically, the impurity may include one or more selected from the group consisting of a thermally conductive metal hydride, a thermally conductive metal oxide, a thermally conductive metal nitride, a thermally conductive metal-uranium compound, a thermally conductive metal-plutonium compound, and a thermally conductive metal-thorium compound.

Specifically, the thermally conductive metal layer may include one or more selected from the group consisting of molybdenum (Mo), chromium (Cr), tungsten (W), niobium (Nb), ruthenium (Ru), vanadium (V), hafnium (Hf), tantalum (Ta), rhodium (Rh), zirconium (Zr), beryllium (Be), and aluminum (Al).

Based on the total weight of the nuclear fuel pellet, the content of the thermally conductive metal layer may be 1 wt. % to 10 wt. %, and the content of the thermally conductive metal layer is preferably 1 wt. % to 5 wt. %, but is not limited thereto. This corresponds to a small amount compared to the case of using thermally conductive metal powder as an additive to the nuclear fuel powder. Therefore, a significant effect of thermal conductivity enhancement may be derived even with a small amount.

The thermally conductive metal layer may be manufactured in various forms, and may be a plate shape entirely formed above or below the nuclear fuel pellet, and it may be a cross shape or radial shape partially formed above or below the nuclear fuel pellet, in order to connect a peripheral portion in contact with a nuclear fuel cladding tube in a radial direction from the center. As such, the temperature reduction effect is effective, and accordingly, a significant effect of thermal conductivity enhancement may be derived. The shapes (plate shape, cross shape, and radial shape) of the thermally conductive metal layer according to various embodiments of the present invention are as shown in FIG. 1.

Meanwhile, the nuclear fuel pellet laminate structure having enhanced thermal conductivity according to the present invention may be manufactured by including (a) a step of molding and thermally treating nuclear fuel powder to manufacture a nuclear fuel pellet; and (b) a step of disposing a thermally conductive metal layer above or below the nuclear fuel pellet manufactured in step (a), and each step will be described below.

Method for Manufacturing a Nuclear Fuel Pellet Laminate Structure Having Enhanced Thermal Conductivity The present invention provides a method for manufacturing a nuclear fuel pellet laminate structure having enhanced thermal conductivity, including (a) a step of molding and thermally treating nuclear fuel powder to manufacture a nuclear fuel pellet; and (b) a step of disposing a thermally conductive metal layer above or below the nuclear fuel pellet manufactured in step (a).

In addition, the present invention may provide a method for enhancing thermal conductivity of a nuclear fuel pellet laminate structure, including (a) a step of molding and thermally treating nuclear fuel powder to manufacture a nuclear fuel pellet; and (b) a step of disposing a thermally conductive metal layer above or below the nuclear fuel pellet manufactured in step (a).

First, the method for manufacturing a nuclear fuel pellet laminate structure having enhanced thermal conductivity according to the present invention includes a step [step (a)] of molding and thermally treating nuclear fuel powder to manufacture a nuclear fuel pellet.

The nuclear fuel powder is formed from a nuclear fuel precursor, and it refers to a state before performing a granulation process, which is a distinct concept.

Specifically, the nuclear fuel powder may include one or more oxide nuclear fuel powders selected from the group consisting of uranium oxide ($UO_2$), plutonium oxide ($PuO_2$), and thorium oxide ($ThO_2$), and other than the above, it may include one or more uranium or alloy compounds thereof selected from the group consisting of a uranium compound (U compound), a uranium-silicon compound (U—Si compound), a uranium-gadolinium compound (U—Gd compound), a uranium-thorium compound (U—Th compound), and a uranium-plutonium compound (U—Pu compound). In this case, the average particle size of the nuclear fuel powder may be 0.1 µm to 50 µm, preferably, 0.1 µm to 30 µm, but is not limited thereto.

In addition, the molding may be performed through a pressing method, and is preferably performed through a uniaxial pressing method, but is not limited thereto. In this case, the molding may be performed for 30 seconds to 10 hours under a pressure of 100 MPa to 500 MPa.

In addition, the thermal treatment is for the manufacture of a nuclear fuel pellet, and may be performed at a temperature of 1,300° C. to 1,800° C. for 1 hour to 20 hours, and is preferably performed at a temperature of 1,500° C. to 1,800° C. for 1 hour to 20 hours, but is not limited thereto. Since it is a state in which thermally conductive metal powder is not added to a nuclear fuel molded body to be subjected to the thermal treatment, it is not necessary to consider suppressing impurities formed by the thermally conductive metal powder when setting the thermal treatment conditions.

Since the nuclear fuel pellet manufactured according to the above molding and thermally treating processes has been described above, duplicate description will be omitted.

In particular, by maintaining the ratio of the diameter to the height of the nuclear fuel pellet at 1.6 or more, preferably, 1.6 to 2.0, the effect of thermal conductivity enhancement may be maximized by spacing apart the thermally conductive metal layer at a regular interval.

Next, the method for manufacturing a nuclear fuel pellet laminate structure having enhanced thermal conductivity according to the present invention includes a step [step (b)] of disposing a thermally conductive metal layer above or below the manufactured nuclear fuel pellet.

Since the thermally conductive metal layer has been described above, duplicate description will be omitted.

Meanwhile, the thermally conductive metal layer is characterized in that it is separately disposed in a post-processing process after the thermal treatment, and it is preferable that impurity is not formed due to a chemical reaction of the thermally conductive metal layer, and the impurity may interfere with heat transfer. Specifically, the impurity may be a hydride formed by bonding of the thermally conductive metal with hydrogen under a high-temperature thermal treatment condition, or a secondary phase formed by reacting with nuclear fuel powder. More specifically, the impurity may include one or more selected from the group consisting of a thermally conductive metal hydride, a thermally conductive metal oxide, a thermally conductive metal nitride, a thermally conductive metal-uranium compound, a thermally conductive metal-plutonium compound, and a thermally conductive metal-thorium compound.

That is, the thermally conductive metal layer should only be physically attached and bonded to the nuclear fuel pellet, and should not react chemically.

In addition, the disposing of the thermally conductive metal layer may be performed through a known method, and may be performed through a coating method, a vapor deposition method, and a 3D printing method. In particular, when the 3D printing method is used, it has an advantage of being able to manufacture the shape of the thermally conductive metal layer in various ways, and in particular, it may be preferably used for manufacturing in a cross shape or radial shape.

In addition, the present invention may provide nuclear fuel including a nuclear fuel pellet laminate structure having enhanced thermal conductivity; and a nuclear fuel cladding tube in which a plurality of the nuclear fuel pellet laminate structures are inserted therein.

Cooling water of about 320° C. flows in a vertical direction (height direction) on the outer surface of the nuclear fuel such that the main direction of heat generated from the nuclear fuel pellet is a radial direction (horizontal direction). In this case, the temperature of the center of the nuclear fuel pellet reaches about 1,000° C. to 1,200° C. even under normal operating conditions. Therefore, it is important to control heat transfer characteristics in a radial direction (horizontal direction), and the nuclear fuel pellet laminate structure having enhanced thermal conductivity has an advantage of being able to enhance thermal conductivity in a radial direction (horizontal direction) while suppressing the formation of impurity.

As described above, the present invention relates to a nuclear fuel pellet laminate structure having enhanced thermal conductivity, including a nuclear fuel pellet; and a thermally conductive metal layer disposed above or below the nuclear fuel pellet, and it is characterized in that the thermally conductive metal layer is separately disposed in a post-processing process such that a chemical reaction does not occur under a thermal treatment condition, thereby being able to enhance thermal conductivity by suppressing the formation of impurity.

In particular, by optimizing the ratio of the diameter to the height of the nuclear fuel pellet, the effect of thermal conductivity enhancement may be maximized by spacing apart the thermally conductive metal layer at a regular interval.

Therefore, the nuclear fuel pellet laminate structure according to the present invention may be easily applied to existing commercial nuclear fuel manufacturing facilities, and may greatly improve nuclear fuel safety and performance under normal operations, and transient and accident conditions.

Hereinafter, preferred exemplary embodiments are presented to aid in understanding the present invention. However, the following exemplary embodiments are only provided to understand the present invention more easily, and the contents of the present invention are not limited by the following exemplary embodiments.

EXAMPLE

Example 1

As nuclear fuel powder, $UO_2$ powder having an average particle size of about 0.3 μm was prepared. It was placed into a powder molding mold, then uniaxially pressurized for about 1 minute under a pressure of about 300 MPa, and then, it was thermally treated for about 4 hours at a temperature of about 1,700° C. under a hydrogen reducing atmosphere with a slight oxygen partial pressure (2% $CO_2$ equivalent) to manufacture a nuclear fuel pellet (about 96% TD). in this case, the diameter of the nuclear fuel pellet was about 8.2 mm, and the height was about 4.5 mm. A plate-shaped Mo layer was deposited on the upper and lower portions thereof under a pressurizing condition of 1,700° C. to manufacture a nuclear fuel pellet laminate structure. In this case, based on the total weight of the nuclear fuel pellet, the content of the plate-shaped Mo layer was about 5 wt. % (refer to FIG. 2(a)).

Example 2

A nuclear fuel pellet laminate structure was manufactured in the same manner as in Example 1, except that the height of the nuclear fuel pellet was adjusted to about 5 mm (refer to FIG. 2(a)).

Examples 3 to 4

Nuclear fuel pellet laminate structures were manufactured in the same manner as in Example 1, except that the heights of the nuclear fuel pellets were adjusted to about 7 mm and 9 mm, respectively (refer to FIG. 2(b)).

Comparative Examples 1 to 4

As nuclear fuel powder, $UO_2$ powder having an average particle size of about 0.3 μm was prepared. It was placed into a powder molding mold, then uniaxially pressurized for about 1 minute under a pressure of about 300 MPa, and then, it was thermally treated for about 4 hours at a temperature of about 1,700° C. under a hydrogen reducing atmosphere with a slight oxygen partial pressure (2% $CO_2$ equivalent) to manufacture a nuclear fuel pellet (about 96% TD). In this case, the diameter of the nuclear fuel pellet was about 8.2 mm, and the height was the same as Table 1 below.

Comparative Examples 5 to 8

As nuclear fuel powder, $UO_2$ powder having an average particle size of about 0.3 μm was prepared. Afterwards, based on the total weight of the $UO_2$ powder, a mixture was prepared by mixing Mo powder having an average particle size of about 0.3 μm at 5 wt. %. It was placed into a powder molding mold, then uniaxially pressurized for about 1 minute under a pressure of about 300 MPa, and then, it was thermally treated for about 4 hours at a temperature of about 1,700° C. under a hydrogen reducing atmosphere with a slight oxygen partial pressure (2% $CO_2$ equivalent) to manufacture a nuclear fuel pellet (about 96% TD). In this case, the diameter of the nuclear fuel pellet was about 8.2 mm, and the height was the same as Table 1 below (refer to FIG. 2(d)).

TABLE 1

| | Diameter | Height | Diameter/Height (AR) |
| --- | --- | --- | --- |
| Example 1 | About 8.2 mm | About 4.5 mm | About 1.82 |
| Example 2 | About 8.2 mm | About 5 mm | About 1.64 |
| Example 3 | About 8.2 mm | About 7 mm | About 1.17 |
| Example 4 | About 8.2 mm | About 9 mm | About 0.91 |
| Comparative Example 1 | About 8.2 mm | About 4.5 mm | About 1.82 |
| Comparative Example 2 | About 8.2 mm | About 5 mm | About 1.64 |
| Comparative Example 3 | About 8.2 mm | About 7 mm | About 1.17 |
| Comparative Example 4 | About 8.2 mm | About 9 mm | About 0.91 |
| Comparative Example 5 | About 8.2 mm | About 4.5 mm | About 1.82 |
| Comparative Example 6 | About 8.2 mm | About 5 mm | About 1.64 |
| Comparative Example 7 | About 8.2 mm | About 7 mm | About 1.17 |
| Comparative Example 8 | About 8.2 mm | About 9 mm | About 0.91 |

FIG. 3 is a calculation and evaluation of thermal conductivity according to the temperature of the nuclear fuel pellet laminate structures manufactured in Examples 1 to 4 by FEM (Finite Element Method) computing simulation, and it is a graph comparing whether the thermal conductivity is enhanced under a temperature condition of 1,200° C., as a result of actually measuring the thermal conductivities of the nuclear fuel pellets manufactured in Comparative Examples 1 to 8.

As shown in FIG. 3, it was confirmed that the nuclear fuel pellet laminate structures manufactured in Examples 1 to 4 had significantly enhanced thermal conductivity compared to the nuclear fuel pellets manufactured in Comparative Examples 1 to 8. This can be seen as a result of the plate-shaped Mo layer being disposed in a horizontal direction at a regular interval without forming impurities as a thermally conductive metal layer. Compared to the nuclear fuel pellets manufactured in Comparative Examples 1 to 4, it was confirmed that the nuclear fuel pellets manufactured in Comparative Examples 5 to 8 had slightly enhanced thermal conductivity, but it was confirmed that there was no significant difference.

In particular, the nuclear fuel pellet laminate structures manufactured in Examples 1 to 4 were confirmed to have a maximized effect of thermal conductivity enhancement as the value of the diameter/height (AR) increased, and thus, the optimized value of diameter/height (AR) can be seen as about 1.6 or more.

The above description of the present invention is for illustrative purposes only, and those of ordinary skill in the art to which the present invention pertains will be able to understand that other specific forms can be easily modified without changing the technical spirit or essential features of the present invention. Therefore, it should be understood that the exemplary embodiments described above are illustrative and non-limiting in all respects.

The invention claimed is:

1. A nuclear fuel pellet laminate structure having enhanced thermal conductivity, comprising:
   a nuclear fuel pellet; and
   a thermally conductive metal layer disposed above or below the nuclear fuel pellet,
   wherein the nuclear fuel pellet is a nuclear fuel matrix, and does not include thermally conductive metal powder,
   wherein a ratio of a diameter to a height of the nuclear fuel pellet is in a range of 1.6 to 2.0,
   wherein formation of impurities due to chemical reactions of the thermally conductive metal layer is suppressed,
   wherein the impurity comprises one or more selected from the group consisting of a thermally conductive metal hydride, a thermally conductive metal oxide, a thermally conductive metal nitride, a thermally conductive metal-uranium compound, a thermally conductive metal-plutonium compound, and a thermally conductive metal-thorium compound,
   wherein the thermally conductive metal layer is a plate shape, a cross shape or radial shape for connecting a peripheral portion in contact with a nuclear fuel cladding tube in a radial direction from the center, and
   wherein the thermally conductive metal layer comprises one or more selected from the group consisting of molybdenum (Mo), chromium (Cr), tungsten (W), niobium (Nb), ruthenium (Ru), vanadium (V), hafnium (Hf), tantalum (Ta), rhodium (Rh), zirconium (Zr), beryllium (Be), and aluminum (Al).

2. The nuclear fuel pellet laminate structure of claim 1, wherein the height of the nuclear fuel pellet is 3 mm to 6 mm.

3. The nuclear fuel pellet laminate structure of claim 1, wherein the content of the thermally conductive metal layer is 1 wt. % to 10 wt. % based on the total weight of the nuclear fuel pellet.

4. A method for manufacturing a nuclear fuel pellet laminate structure having enhanced thermal conductivity, comprising:
   (a) a step of molding and thermally treating nuclear fuel powder to manufacture a nuclear fuel pellet; and
   (b) a step of disposing a thermally conductive metal layer above or below the nuclear fuel pellet manufactured in step (a),
   wherein the nuclear fuel pellet is a nuclear fuel matrix, and does not include thermally conductive metal powder,
   wherein a ratio of a diameter to a height of the nuclear fuel pellet is in a range of 1.6 to 2.0,
   wherein formation of impurities due to chemical reactions of the thermally conductive metal layer is suppressed,
   wherein the impurity comprises one or more selected from the group consisting of a thermally conductive metal hydride, a thermally conductive metal oxide, a thermally conductive metal nitride, a thermally conductive metal-uranium compound, a thermally conductive metal-plutonium compound, and a thermally conductive metal-thorium compound,
   wherein the thermally conductive metal layer is a plate shape, a cross shape or radial shape for connecting a peripheral portion in contact with a nuclear fuel cladding tube in a radial direction from the center, and
   wherein the thermally conductive metal layer comprises one or more selected from the group consisting of molybdenum (Mo), chromium (Cr), tungsten (W), niobium (Nb), ruthenium (Ru), vanadium (V), hafnium (Hf), tantalum (Ta), rhodium (Rh), zirconium (Zr), beryllium (Be), and aluminum (Al).

5. The method of claim 4, wherein the molding in step (a) is performed for 30 seconds to 20 hours under a pressure of 100 MPa to 500 MPa, and the thermally treating is performed for 1 hour to 20 hours at a temperature of 1,300° C. to 1,800° C. under a hydrogen atmosphere.

6. The method of claim 4, wherein the disposing of the thermally conductive metal layer in step (b) is performed through one or more methods selected from the group consisting of a coating method, a vapor deposition method, and a three-dimensional printing method.

* * * * *